United States Patent [19]
Keirsbilck et al.

[11] Patent Number: 5,659,834
[45] Date of Patent: Aug. 19, 1997

[54] FILM CARTRIDGE WITH VISUAL INDICATOR FOR VERIFYING FILM LOADING IN CAMERA

[75] Inventors: Richard Scott Keirsbilck; Joseph Anthony Manico, both of Rochester, N.Y.

[73] Assignee: Eastman Kodak Company, Rochester, N.Y.

[21] Appl. No.: 665,261

[22] Filed: Jun. 17, 1996

[51] Int. Cl.⁶ .......................... G03B 17/26; G03B 23/02; G11B 23/28
[52] U.S. Cl. .......................... 396/515; 396/284; 242/348
[58] Field of Search .......................... 396/515, 511, 396/512, 284; 242/348

[56] References Cited

U.S. PATENT DOCUMENTS

| | | | |
|---|---|---|---|
| 1,836,699 | 12/1931 | Wood | 354/275 |
| 4,335,948 | 6/1982 | Cocco | 354/275 |
| 4,875,638 | 10/1989 | Harvey | 242/71.1 |
| 4,887,110 | 12/1989 | Harvey | 354/275 |
| 4,894,673 | 1/1990 | Beach | 354/275 |
| 5,032,861 | 7/1991 | Pagano | 354/275 |
| 5,255,039 | 10/1993 | Miller | 354/275 |
| 5,264,886 | 11/1993 | Byrd | 354/275 |
| 5,278,600 | 1/1994 | Takahashi et al. | 354/275 |
| 5,285,227 | 2/1994 | Lawther et al. | 354/275 |
| 5,568,216 | 10/1996 | Agostinelli et al. | 396/515 |
| 5,568,219 | 10/1996 | Manico et al. | 396/281 |
| 5,581,320 | 12/1996 | Manico et al. | 396/515 |

*Primary Examiner*—Safet Metjahic
*Assistant Examiner*—John Chizmar
*Attorney, Agent, or Firm*—Roger A. Fields

[57] ABSTRACT

A film cartridge has a housing with a film exit slit, and a film roll support rotatable inside the housing to unwind a filmstrip beginning with a film leader outwardly through the slit to accomplish film loading in a camera. A visible film-loaded indicator is provided on the housing to be seen through a window in a camera. A flexible cover strip has a leading end portion secured to a forward end portion of the film leader which protrudes from the slit, an opaque trailing end portion extending over the film-loaded indicator to prevent the indicator from being seen through the window in the camera, and an intermediate folded portion interconnecting the leading and trailing end portions to unfold as the film leader is moved outwardly through the slit. The folded portion is of suitable length to draw the trailing end portion from over the film-loaded indicator to permit the indicator to be seen through the window in the camera when the film leader is moved substantially completely through the slit. An open pocket contains the cover strip and has an interior transparent shelf which supports the trailing end portion of the cover strip over the film-loaded indicator to permit the indicator to be seen when the trailing end portion is removed from the shelf and which separates the intermediate folded portion of the cover strip from the trailing end portion to permit the folded portion to unfold without moving in contact with the trailing end portion.

3 Claims, 6 Drawing Sheets

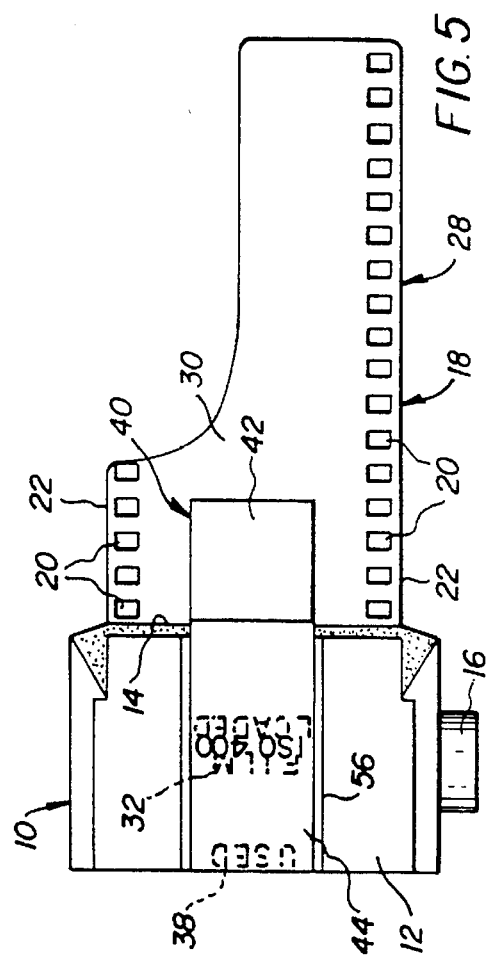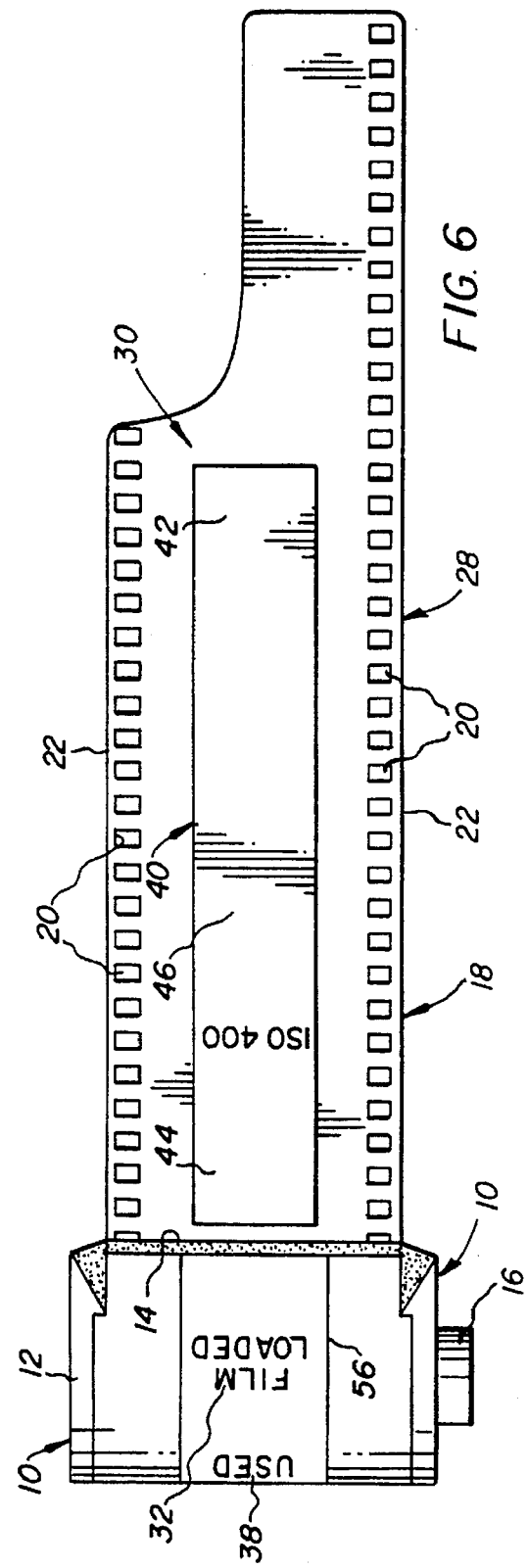

5,659,834

FILM CARTRIDGE WITH VISUAL INDICATOR FOR VERIFYING FILM LOADING IN CAMERA

CROSS-REFERENCE TO RELATED APPLICATIONS

Reference is made to commonly assigned application Ser. No. 08.584,480, entitled FILM CARTRIDGE WITH VISUAL INDICATOR FOR VERIFYING FILM LOADING IN CAMERA and filed Jan. 11, 1996 in the names of Joseph A. Manico and Dwight J. Petruchik, now U.S. Pat. No. 5,568,219.

FIELD OF THE INVENTION

The invention relates generally to the field of photography, and in particular to a film cartridge with a visual indicator for verifying film loading in a camera for example.

BACKGROUND OF THE INVENTION

To load most 35 mm cameras, a film cartridge is inserted in a loading chamber of the camera and the forward end portion of a film leader protruding from a light-trapping slit in the cartridge is placed over a take-up spool in the camera. In some cameras, the forward end portion of the film leader is manually attached to the take-up spool before a rear door of the camera is closed. Then, a film loading or winding operation is performed, for example, by manually pivoting a winding lever for the take-up spool and manually depressing a shutter release button several times. This is done until the entire leader is unwound from a supply spool inside the cartridge and is wound onto the take-up spool, and the first-available film frame is positioned for exposure. In other cameras, the forward end portion of the film leader is automatically secured to the take-up spool at the beginning of the film loading operation. As the take-up spool is rotated via a motor drive, for example, one or more circumferential teeth of the spool engage the forward end portion of the film leader at its perforations to wind the leader onto the spool and position the first-available film frame for exposure. A spring-like deflector or other suitable means may be provided on the rear door of the camera for pressing the film leader against the take-up spool to facilitate engagement of the forward end portion of the leader by the circumferential teeth of the spool.

A problem that exists in some 35 mm cameras is that even though the photographer believes the forward end portion of the film leader is secured to the take-up spool, the forward end portion may fail to be engaged with the spool or may become disengaged from the spool during the film loading operation. As a result, the film leader will not be wound onto the take-up spool and the first-available film frame cannot be positioned for exposure. However, since the rear door of the camera is closed, the photographer may not be aware of the malfunction.

THE CROSS-REFERENCED APPLICATION

The cross-referenced application discloses a film cartridge having a housing with a film exit slit, and a film roll support rotatable inside the housing to unwind an unexposed filmstrip beginning with a film leader from the film roll support to permit the film leader to be moved outwardly through the slit to accomplish film loading in a camera. A visible film-loaded indicator is imprinted on the housing to be seen through a window in a camera. A flexible opaque cover strip has a leading end portion secured to a forward end portion of the film leader which protrudes from the slit, a trailing end portion located outside the housing over the film-loaded indicator to prevent the indicator from being seen through the window in the camera, and an intermediate folded portion located inside the housing with respective superimposed sections that extend outwardly through the slit to the leading and trailing end portions to be pulled one after the other by the leading end portion to unfold as the film leader is moved outwardly through the slit. The intermediate folded portion is of suitable length to draw the trailing end portion from over the film-loaded indicator to permit the indicator to be seen through the window in the camera when the film leader is moved substantially completely through the slit. A transparent open pocket maintains the opaque trailing end portion over the film-loaded indicator, but permits the indicator to be seen when the trailing end portion is removed from the indicator.

Several problems have been found using this version of the film cartridge. One problem is that extension of the two superimposed sections through the slit deforms a light-trapping plush in the slit, which might allow ambient light to leak into the housing and fog the unexposed filmstrip. Another problem possibly is that the clock-springing nature of the film roll may tend to pack the two superimposed sections against the housing, which creates a drag on the film leader as it is moved from outwardly through the slit.

An alternate version of the cartridge which does not suffer these problems is disclosed in the cross-referenced application. In this version of the cartridge, the intermediate folded portion of the cover strip is located in the open pocket with its two superimposed sections sandwiched between the trailing end portion of the cover strip and the film-loaded indicator. Thus, the two superimposed sections do not extend through the slit to deform the light-trapping plush and cannot be effected by the clock-springing nature of the film roll.

However, in this version of the cartridge it has been found that when the intermediate folded portion is pulled by the leading end portion to unfold as the film leader is moved outwardly through the slit the trailing end portion might be moved with the folded portion to prematurely uncover the film-loaded indicator.

SUMMARY OF THE INVENTION

A film cartridge comprising a housing with a film exit slit, and a film roll support rotatable inside the housing to unwind a filmstrip beginning with a film leader from the film roll support to permit the film leader to be moved outwardly through the slit to accomplish film loading in a camera, is characterized by:

a visible film-loaded indicator located outside the housing to be seen through a window in a camera;

a flexible cover strip having a leading end portion secured to a forward end portion of the film leader, an opaque trailing end portion located outside the housing over the film-loaded indicator to prevent the indicator from being seen through the window in the camera, and an intermediate folded portion located outside the housing between the leading and trailing end portions to be pulled by the leading end portion to unfold as the film leader is moved outwardly through the slit and being of suitable length to draw the trailing end portion from over the film-loaded indicator to permit the indicator to be seen through the window in the camera when the film leader is moved substantially completely through the slit; and an open pocket containing the cover strip outside the housing and having an interior transparent shelf supporting the trailing end portion of the cover strip over the film-loaded indicator to permit the indicator to be seen when the trailing end portion is removed from the shelf and separating the intermediate folded portion of the cover strip from the trailing end portion to permit the folded portion to unfold without moving in contact with the trailing end portion.

BRIEF DESCRIPTION OF THE DRAWINGS

FIG. 5 is a plan view of the cartridge as seen in FIG. 1;

FIG. 6 is a plan view of the cartridge as seen in FIG. 4;

DETAILED DESCRIPTION OF THE INVENTION

Figure 1:
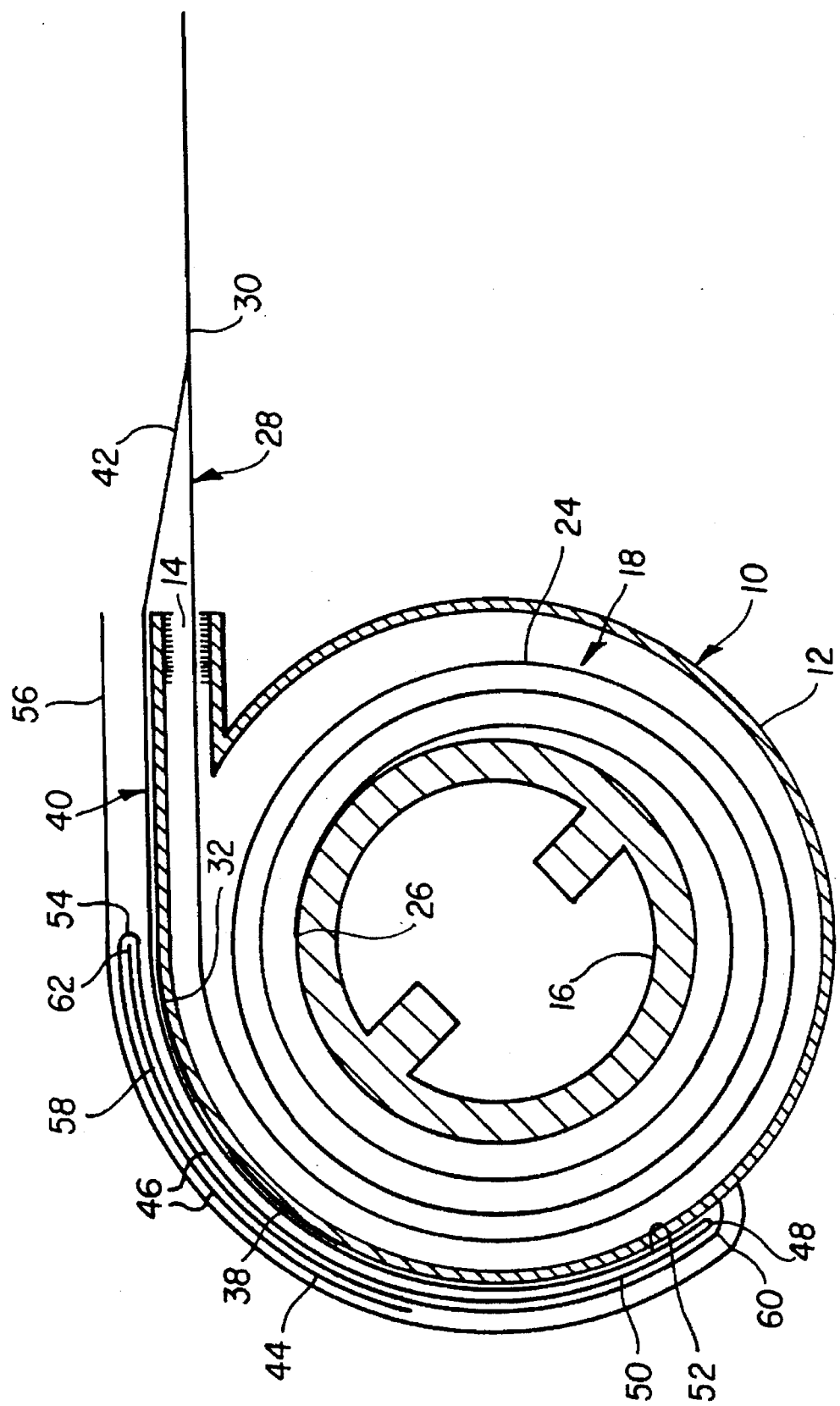
FIG. 1 is a partial section view of a film cartridge with a visual indicator for verifying film loading in a camera according to a preferred embodiment of the invention, showing the cartridge with a film leader partially protruding from the cartridge before film loading.
Figure 2:
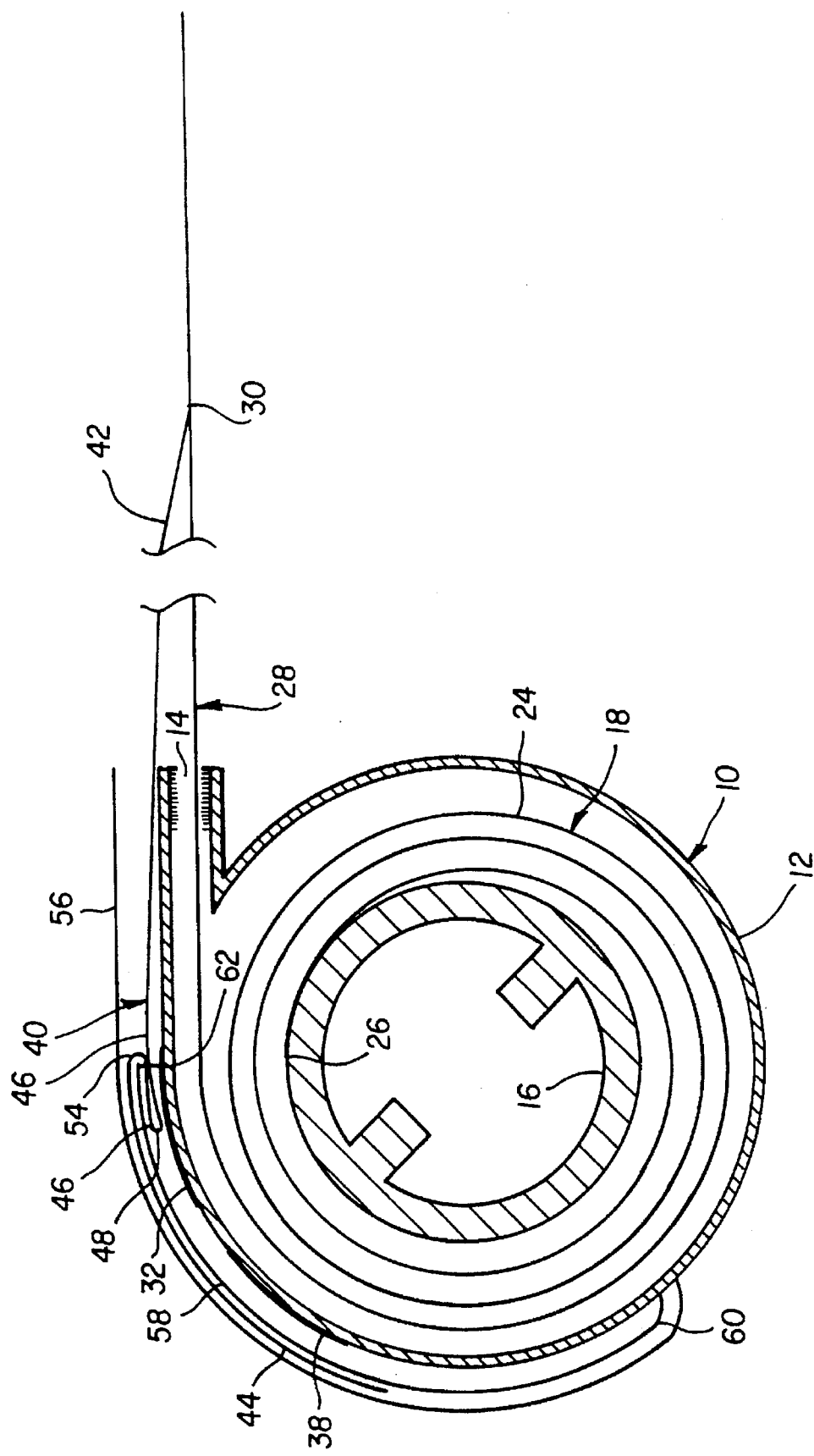
FIGS. 2–4 are partial section views similar to FIG. 1, showing the cartridge with the film leader being progressively withdrawn from the cartridge for film loading.

The invention is disclosed as being embodied preferably in a film cartridge. Because the features of a film cartridge are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–6 show a film cartridge 10 comprising a housing 12 with a plush-lined light-trapping film exit slit 14 and a flanged film spool 16 rotatably supported inside the housing. A known 35 mm filmstrip 18 having two identical series of edge perforations 20 inwardly adjacent respective longitudinal film edges 22 is loosely coiled in a film roll 24 about the film spool 16 between a pair of radial flanges, not shown, on the film spool. An inner end portion 26 of the filmstrip 18 is attached to the film spool 16. The first several frame lengths, i.e. 3–4 frame lengths, of the filmstrip 18 constitute a film leader 28. The film leader 28 forms an outermost convolution of the film roll 26 and has a partly reduced-width forward end portion 30 that initially protrudes from the film exit slit 14. See FIGS. 1 and 5.

Figure 8:
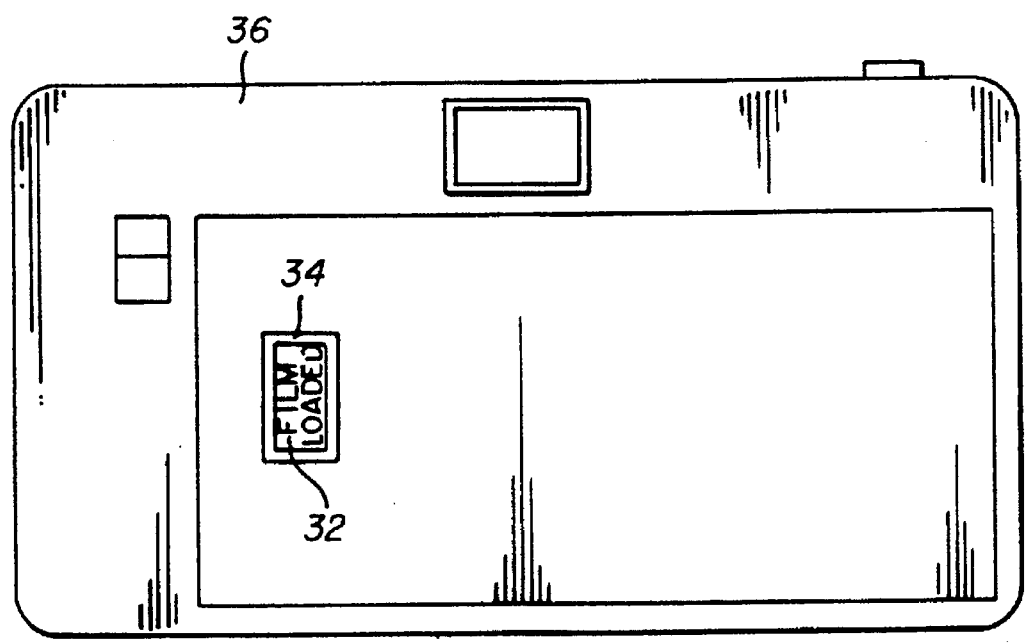
FIG. 8 is a rear elevation view of camera containing the cartridge as seen in FIGS. 4 and 6.

A "FILM LOADED" 32 indicator is imprinted on the exterior of the housing 12 at a location that permits the indicator to be seen through a rear window 34 of a camera 36 when the cartridge 10 is in the camera. See FIGS. 4, 6 and 8. A "FILM USED" indicator 38 is imprinted on the exterior of the housing 12 at a location that prevents the indicator from being seen through the rear window 34.

Figure 3:
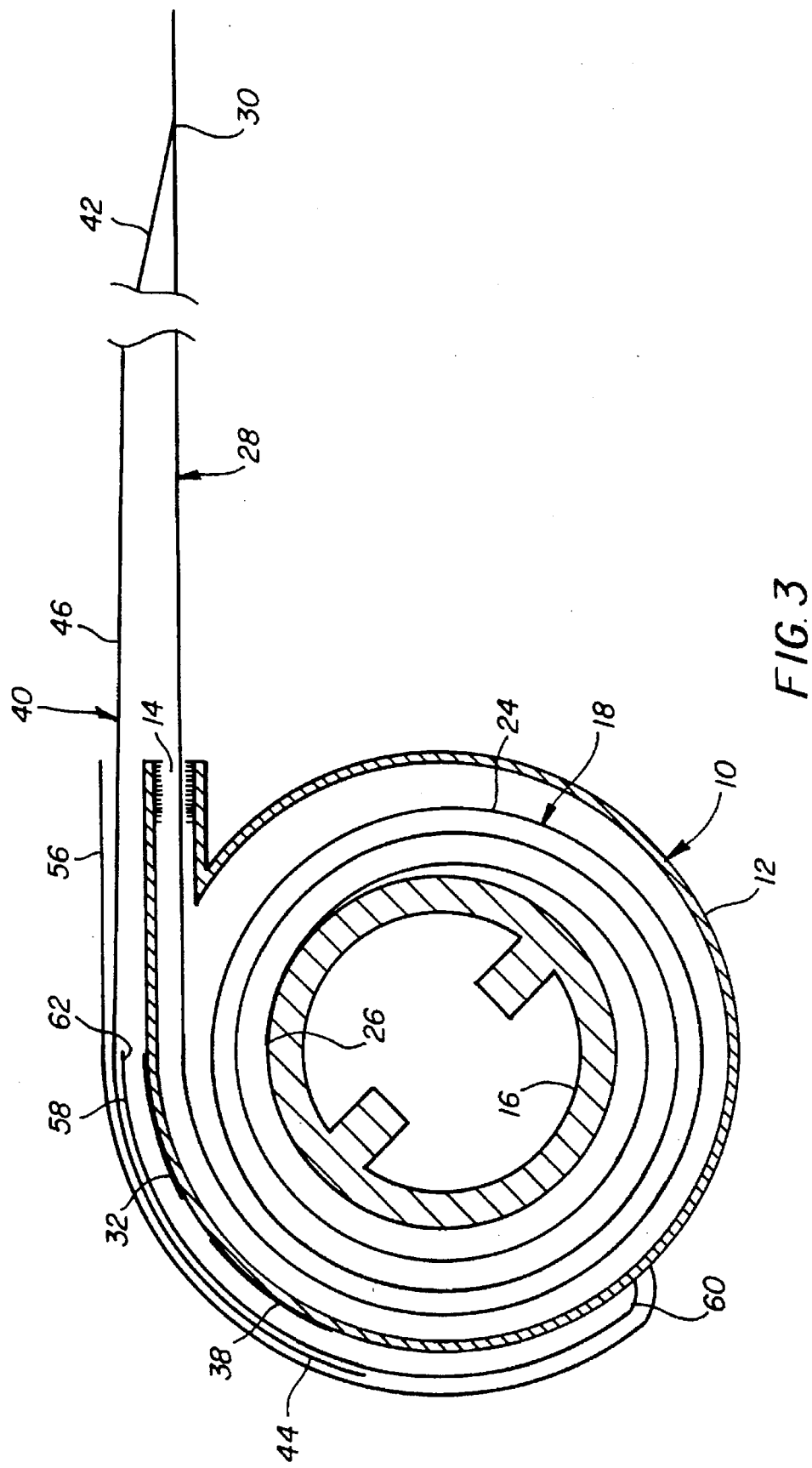
Figure 4:
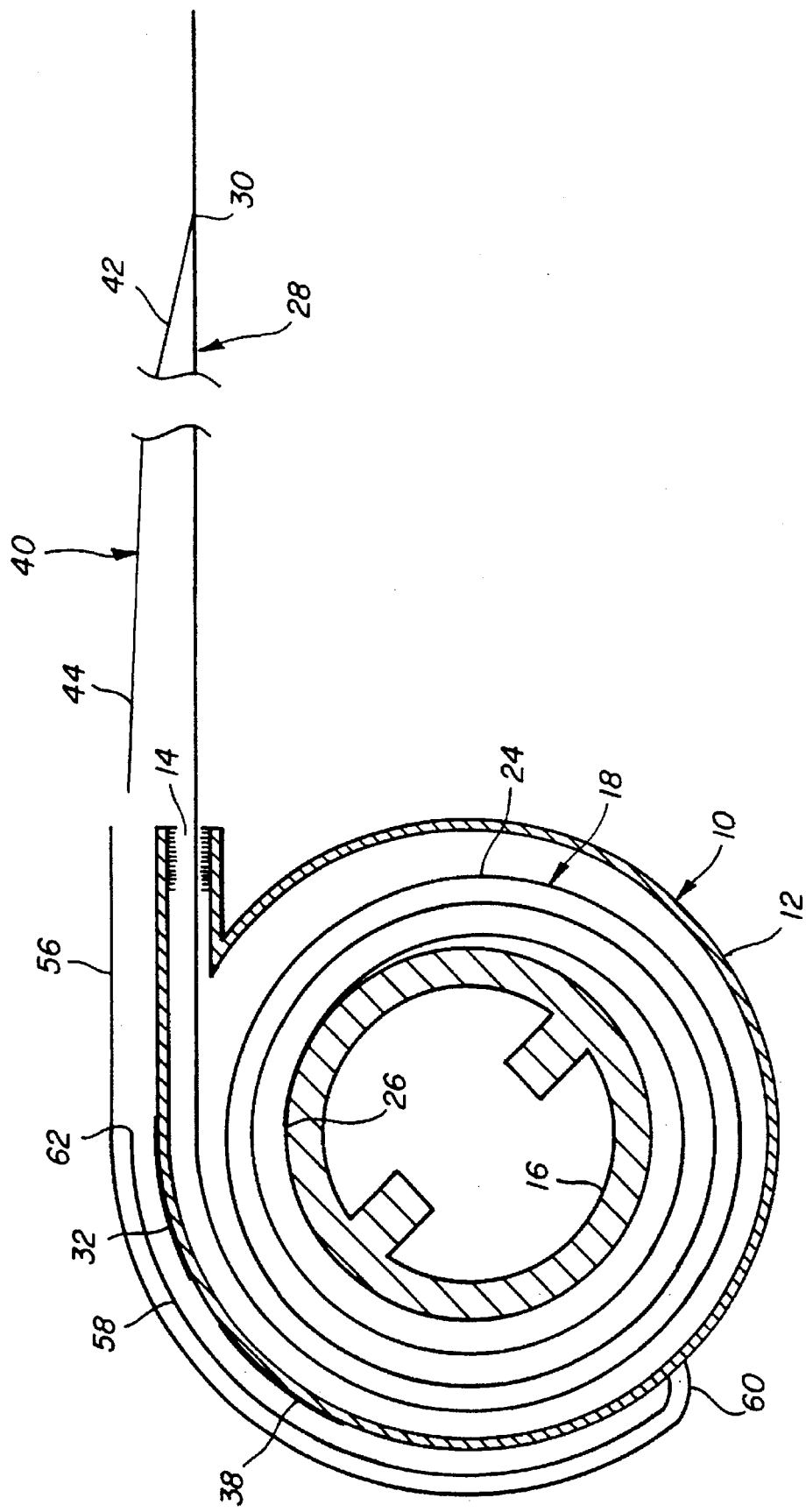

A flexible opaque cover strip 40 is located outside the housing 12 and as shown in FIG. 1 consists of a leading end portion 42, a trailing end portion 44 and an intermediate folded portion 46 which interconnects the leading end and trailing end portions. The cover strip 40 is sufficiently narrower than the filmstrip 18 to be able to rest on the filmstrip between the two series of edge perforations 20 as shown in FIG. 6. The leading end portion 42 is permanently hingedly secured to the protruding forward end portion 30 of the film leader 28 as shown in FIGS. 1 and 5. The trailing end portion 44 extends over the "FILM LOADED" indicator 32 and the "FILM USED" indicator 38 as shown in FIGS. 1 and 3. The intermediate folded portion 46 has a rearward fold 48 that divides that portion into two superimposed upper and lower sections 50 and 52 which are stacked between the trailing end portion 44 and the "FILM LOADED" and "FILM USED" indicators 32 and 38 as shown in FIG. 1. The upper section 50 and the trailing end portion 44 are connected at a forward fold 54.

A transparent open pocket 56 substantially contains the opaque cover strip 40 and is secured to the exterior of the housing 12. The pocket 56 has an interior transparent shelf 58 which supports the trailing end portion 44 of the cover strip 40 over the "FILM LOADED" indicator 32 and the "FILM USED" indicator 38 and which lies between the intermediate folded portion 46 of the cover strip and the trailing end portion to separate the two portions, as shown in FIG. 1. The rearward fold 48 that divides the intermediate folded portion 46 of the cover strip 40 into the superimposed upper and lower sections 50 and 52 is located opposite a rearward end 60 of the shelf 58 that is joined to the housing 12. The forward fold 54 that connects the upper section 50 and the trailing end portion 44 of the cover strip 40 is formed around a free end 62 of the shelf 58.

OPERATION

Figure 7:
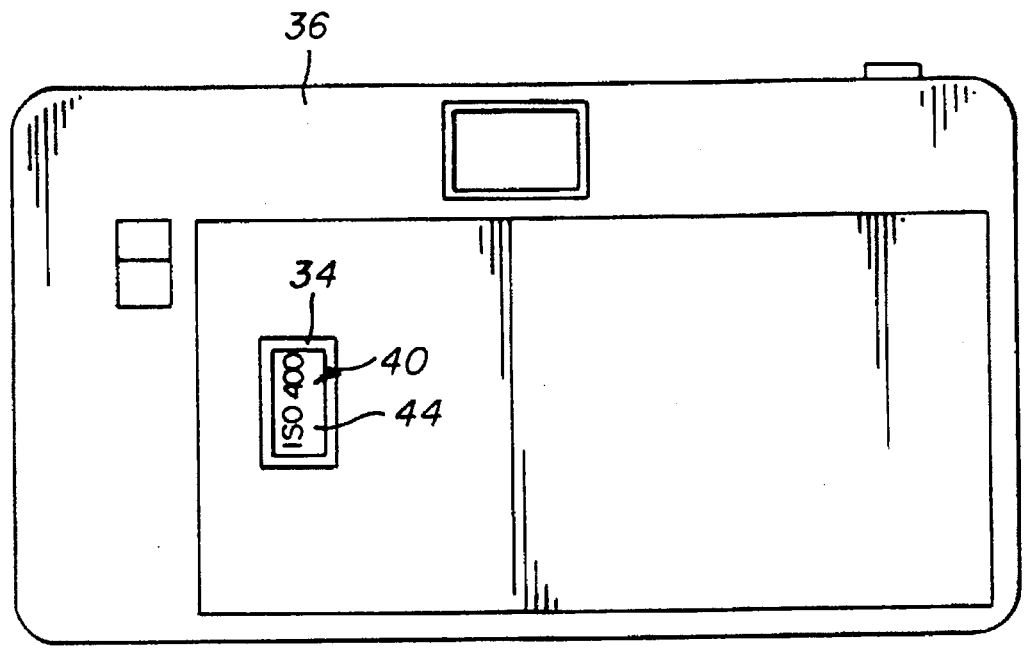
FIG. 7 is a rear elevation view of camera containing the cartridge as seen in FIGS. 1 and 5.

When the cartridge 10 is inserted in the camera 36, the "FILM LOADED" indicator 32 cannot be seen in the rear window 34 because the trailing end portion 44 and the intermediate folded portion 46 of the cover strip 40 are covering the indicator. See FIGS. 1, 5 and 7.

The protruding forward end portion 30 of the film leader 28 is attached to a take-up spool, not shown, in the camera 36 and the spool is windingly rotated to wind the protruding forward end portion onto the take-up spool and to unwind the remainder of the film leader 28, i.e. the outermost convolution of the film roll 26, off the film spool 16, outwardly through the film exit slit 14 and onto the take-up spool. As the film leader 28 is moved from the cartridge 10 and onto the take-up spool, the leading end portion 42 of the cover strip 40 is moved together with the forward end portion 30 of the film leader. Consequently, the lower section 52 of the intermediate folded portion 46 of the cover strip 40 is pulled from beneath the upper section 50 of the intermediate folded portion, which causes the intermediate folded portion eventually to unfold at its rearward fold 48 between the two sections. See FIGS. 2 and 3. Once the intermediate folded portion 46 is pulled by the film leader 28 from under the shelf 58 and substantially out of the pocket 56, the cover strip 40 is unfolded at its forward fold 54 as shown in FIG. 3. Then, the trailing end portion 44 of the cover strip 40 is pulled off the shelf 58 and out of the pocket 56 to successively uncover the "FILM USED" indicator 38 and the "FILM LOADED indicator 32. See FIGS. 4, 6 and 8. Thus, the "FILM LOADED" indicator 32 is not finally uncovered until the film leader 28 is removed from the housing 12. This serves to verify that enough of the filmstrip 18, i.e. 3–4 frame lengths, has been unwound from the film spool 16 to wind the film leader 28 onto the take-up spool in order to accomplish film loading in the camera 36.

The invention has been described with reference to a preferred embodiment. However, it will be appreciated that variations and modifications can be effected by a person of ordinary skill in the art without departing from the scope of the invention.

PARTS LIST 10. film cartridge
12. housing
14. slit
16. film spool
18. filmstrip
20. film perforations
22. longitudinal film edges
24. film roll
26. film inner end portion
28. film leader
30. protruding forward end portion
32. "FILM LOADED" indicator
34. rear window
36. camera
38. "FILM USED" indicator
40. cover strip
42. leading end portion
44. trailing end portion
46. intermediate folded portion
48. rearward fold
50. upper section
52. lower section
54. forward fold
56. pocket
58. interior shelf
60. rearward end
62. free end

We claim:

1. A film cartridge comprising a housing with a film exit slit, and a film roll support rotatable inside said housing to unwind a filmstrip beginning with a film leader from said film roll support to permit said film leader to be moved outwardly through said slit to accomplish film loading in a camera, is characterized by:

a visible film-loaded indicator located outside said housing to be seen through a window in a camera;

a flexible cover strip having a leading end portion secured to a forward end portion of said film leader, an opaque trailing end portion located outside said housing over said film-loaded indicator to prevent the indicator from being seen through the window in the camera, and an intermediate folded portion located outside said housing between said leading and trailing end portions to be pulled by said leading end portion to unfold as said film leader is moved outwardly through said slit and being of suitable length to draw said trailing end portion from over said film-loaded indicator to permit the indicator to be seen through the window in the camera when said film leader is moved substantially completely through said slit; and an open pocket containing said cover strip outside said housing and having an interior transparent shelf supporting said trailing end portion of the cover strip over said film-loaded indicator to permit the indicator to be seen when the trailing end portion is removed from said shelf and separating said intermediate folded portion of the cover strip from the trailing end portion to permit the folded portion to unfold without moving in contact with the trailing end portion.

2. A film cartridge as recited in claim 1, wherein said trailing end portion and said intermediate folded portion of the cover strip are connected at a forward fold that is formed around a free end of said shelf.

3. A film cartridge as recited in claim 2, wherein said two superimposed sections of the intermediate folded portion of the cover strip are connected at a rearward fold that is located opposite another end of said shelf which is joined to said housing.

* * * * *